Feb. 18, 1969 D. GRAY 3,428,749

FACSIMILE SYSTEM

Filed Sept. 10, 1963 Sheet 1 of 4

INVENTOR
Dudley Gray

By William J. Hosman
Attorney

INVENTOR
Dudley Gray

By William J. Newman
Attorney

Feb. 18, 1969 D. GRAY 3,428,749

FACSIMILE SYSTEM

Filed Sept. 10, 1963 Sheet 3 of 4

INVENTOR
Dudley Gray

By William J. Newman
Attorney

INVENTOR
Dudley Gray

By William J. Newman
Attorney 3,428,749
FACSIMILE SYSTEM

Dudley Gray, Chicago, Ill., assignor to Stewart-Warner Corporation, Chicago, Ill., a corporation of Virginia
Filed Sept. 10, 1963, Ser. No. 307,844
U.S. Cl. 179—4 29 Claims
Int. Cl. H04m *11/06*

ABSTRACT OF THE DISCLOSURE

A facsimile system for use in transmitting facsimile data over the normal telephone switching networks. The system includes circuits in the transmitter for transporting the original document to the scanner during the initial phasing period as well as control circuits in the receiver for transporting moist recording paper to the marking means during the phasing period. Also disclosed are means for the automatic operation of the receiver responsive to a facsimile transmission call from a facsimile transmitter station. Means for maintaining the marking electrodes of the receiver recorder at proper electrical operating levels is also shown.

This invention relates to improvements in facsimile equipment and more particularly it relates to improvements in facsimile transmitters and receivers which make them adaptable for more extensive use with commercial telephone systems.

Facsimile systems are used primarily for relaying duplicate copy representations of documents between remote locations. Generally a facsimile system comprises a transmitter in which an eletcromechanical means scans the document to produce a signal which varies in accordance with the light intensity of the segment being scanned. A receiver at the remote location applies the varying signals to an electromechanical scanning transducer to cause the marking of an electrosensitive medium with the light density corresponding to the document at the transmitter being scanned. The scanning means in the transmitter and the receiver are synchronized with one another so that the copy formed at the receiver is essentially a reproduction of the document scaned at the transmitter.

Facsimile equipment is used primarily with communication lines supplied by the telephone companies. These lines are essentially voice grade telephone circuits with some special treatment to upgrade them to be suitable for facsimile use. Therefore, the facsimile equipment previous to this invention have been restricted to use only with special telephone lines leased from the telephone company.

Leased line operation is expensive and this expense in turn limits the number of transmitting or receiving terminals which a user can afford to maintain. The cost of leased lines can range from perhaps $3.00 to as much as $7.00 per mile per month so that exceptionally large volumes of documents must be relayed before reasonable costs per document can be obtained. The use of facsimile to relay documentary information has, therefore, been restricted in the past to high volume users.

Since the leased telephone lines represent a substantial portion of the cost per document figure, a substantial savings would be realized by the low volume user if he could avail himself of equipment which operates over the normal telephone switching network. No special lines would be necessary and the cost per document figures would be determined by the actual time for transmission. There would be no charge for time off the line as in the case of leased line systems because the lines are all ready in place for normal telephone communications.

In the past the need for leased lines has limited the use of facsimile systems to the transmission of documents between two fixed locations. Generally the lines are strung especially for the user, and he is thus limited to transmissions between the terminals of the specially strung lines. However, equipment of the type hereinafter disclosed which is adapted for use on the telephone switching networks may be used between any two remote locations served by the telephone system and can be interconnected whenever desired just as telephones for normal voice communication.

The equipment hereinafter described is designed for use with the normal telephone switching networks such as owned and operated by the Bell Telephone System in conjunction with terminal equipment manufactured and supplied by the Bell Telephone Company under their trade name "Dataphone" Model No. 602A which is now available to the public. The Dataphone is a dial telephone to which data handling capabilities have been added. It is used in exactly the same way as a dial telephone for local or toll voice calls. Dataphones are supplied by the telephone companies at the desired terminals and a facsimile transmitter and/or receiver of the type hereinafter described is connected thereto.

If it is desired that a facsimile transmission be made the call is established in the normal manner by dialing the receiver station number on the transmitter dataphone equipment. When the receiver party answers the two parties may converse and when the sender wishes to transmit the document he merely presses a function button on the Dataphone and inserts the document into the transmitter. The party on the receiving station presses the function button on his Dataphone to connect the facsimile receiver equipment to the telephone network. When the proper interconnections are made between the facsimile transmitter and receiver over the telephone network the pulsating DC signal voltage from the transmitter is converted to a frequency modulated signal by the Dataphone, transmitted by the switching network to the Dataphone at the receiving station and converted to a DC signal which operates the facsimile receiver. At the conclusion of the data transmission the two parties return to the talk mode by pressing the talk function button on each Dataphone for further conversation or for terminating the call by replacing the hand set in the cradle just as with an ordinary telephone. Provisions are also made in the facsimile receiver equipment to automatically answer an incoming call for facsimile transmission if there is no attendant as will be hereinafter discussed.

In view of the telephone company's general practice to charge for telephone calls over their switching networks on a time basis it is highly advantageous that the facsimile equipment be designed for maximum time efficiency. For example, the initial transmission period after a call is established is devoted to equipment phasing and document runup to the transmitter scanner. Useful data is not being relayed during this time period but the time is being charged. Maximum use of this time period is accomplished in the transmitter of the present system by providing for the concurrent operation of the phasing and document runup operations during the short interval before the transmission of the information signals. Timing means are provided for governing the phasing and document runup function period and for switching the transmitter to a document information or video mode thereafter for relating the desired information.

It is also desirable that the interval between the end of transmission of facsimile information and the termination of the call, or hang up, be held to a minimum. An automatic shutoff feature is therefore provided which causes the facsimile transmitter to be shut down after the transmission of the document information if there is not a following document to be transmitted. The same timing means as is used for the phasing and document runup period at the beginning of the transmission is used to control the automatic shutoff. It function to shut the transmitter down and give an alarm indication a predetermined time after the end of data transmission if another document is not inserted into the transmitter.

Time and money saving features are also provided in the receiver of this facsimile system. The receiver is adapted for normal answering in which an attendant at the receiver station answers the call when alerted by a bell and holds a conversation with the calling party. Thereafter the receive attendant may switch to the data receiving function to print a document being relayed. There is also provided an automatic answering feature which enables a calling party to reach an unattended receiver. This is especially useful if night time transmission is desired to take advantage of the lower telephone rates during off peak hours. With the automatic answering feature an attendant is not necessary at the receiving station as electric circuitry automatically answers the call and causes a signal to be transmitted back to the calling party that the receiver is in condition to receive the facsimile transmission. However, if the receiver is not in condition, for example due to a short paper supply or power failure, the automatic answering feature operates to refuse the call so that no charge is made for the attempt.

As may be seen it is a primary object of this invention to provide a facsimile system for use in transmitting facsimile data over the normal telephone switching networks. More particularly it is an object all of this invention to provide a facsimile system which performs all of the required functions to reproduce documents at a remote location in a minimum amount of time to avoid excessive telephone company toll charges.

It is another feature of this invention to provide a unique power transfer means for the paper drive mechanism in the facsimile receiver. The recording paper is stored in roll form in the receiver and is driven past the scanning transducer out of the receiver housing by means of a synchronous motor in a manner well known in the art. The paper must travel past the scanning transducer at a speed related to the speed at which the document passes the scanner in the facsimille transmitter in order that the reproduction be a true representation of the original document. The transmitter therefore sends a synchronizing signal which is used to synchronize the receiver power supply for the paper drive motor. As previously mentioned, it is desirable to terminate the call as soon as the facsimile data is completed. However, if this is done the synchronizing signal would be lost and the paper drive motor would cease, leaving the portion of the recording paper with the reproduced document inside the receiver housing. There is, therefore, provided automatic means for switching the paper drive motor to a local power supply which is not dependent on the synchronizing signal and the paper drive motor is operated by the local power supply for a predetermined time interval sufficient to remove the reproduced document out of the receiver.

Other objects, features and advantages of the facsimile system disclosed herein will be obvious to one skilled in the art upon a further reading of this specification especially when taken in view of the accompanying drawings in which.

Figure 2:
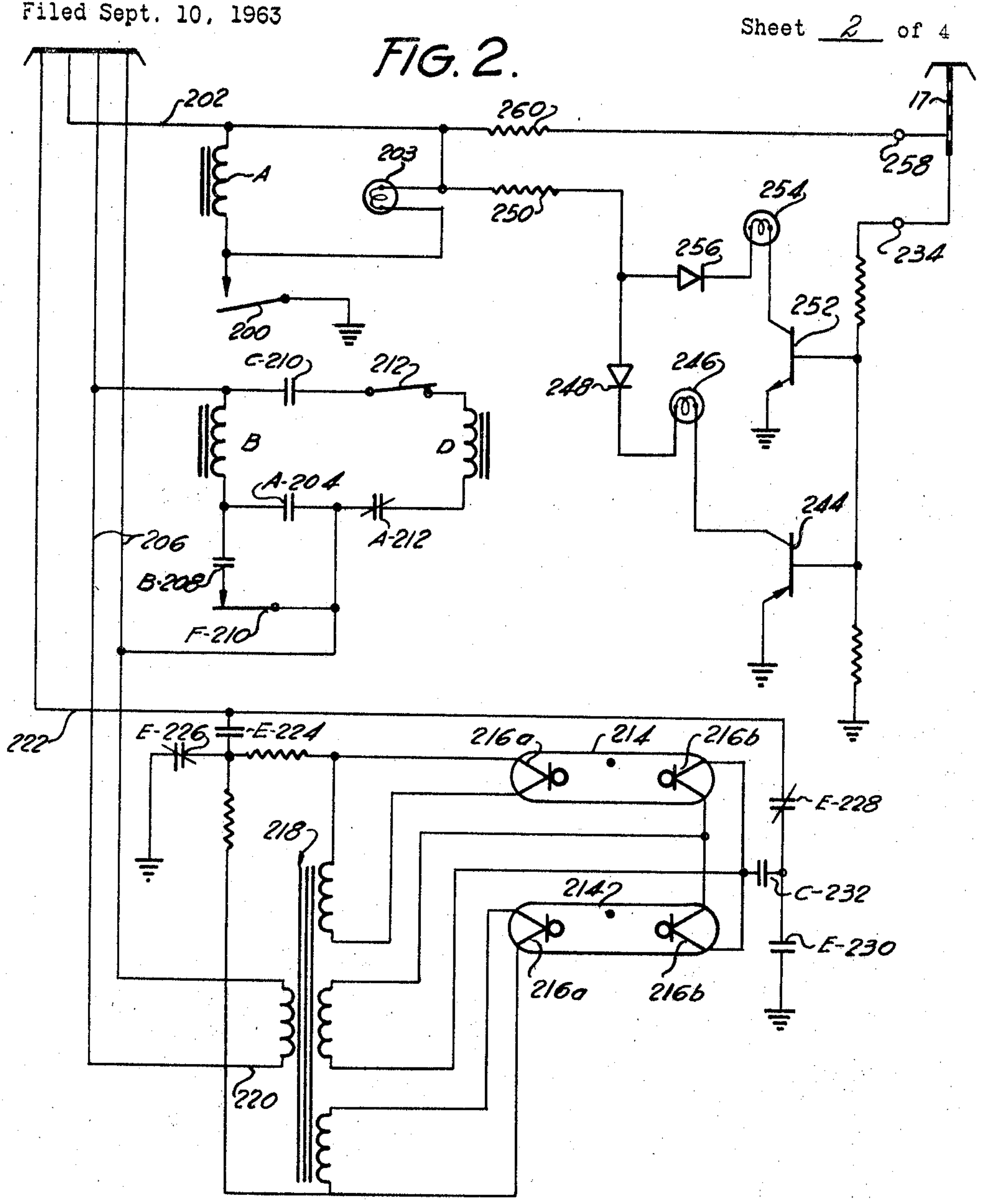
Figure 5:
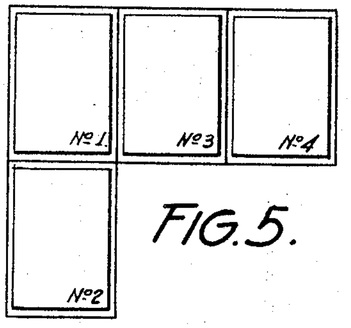
FIG. 5 is a diagram of assistance to show the arrangement of FIGS. 1 through 4.
Figure 3:
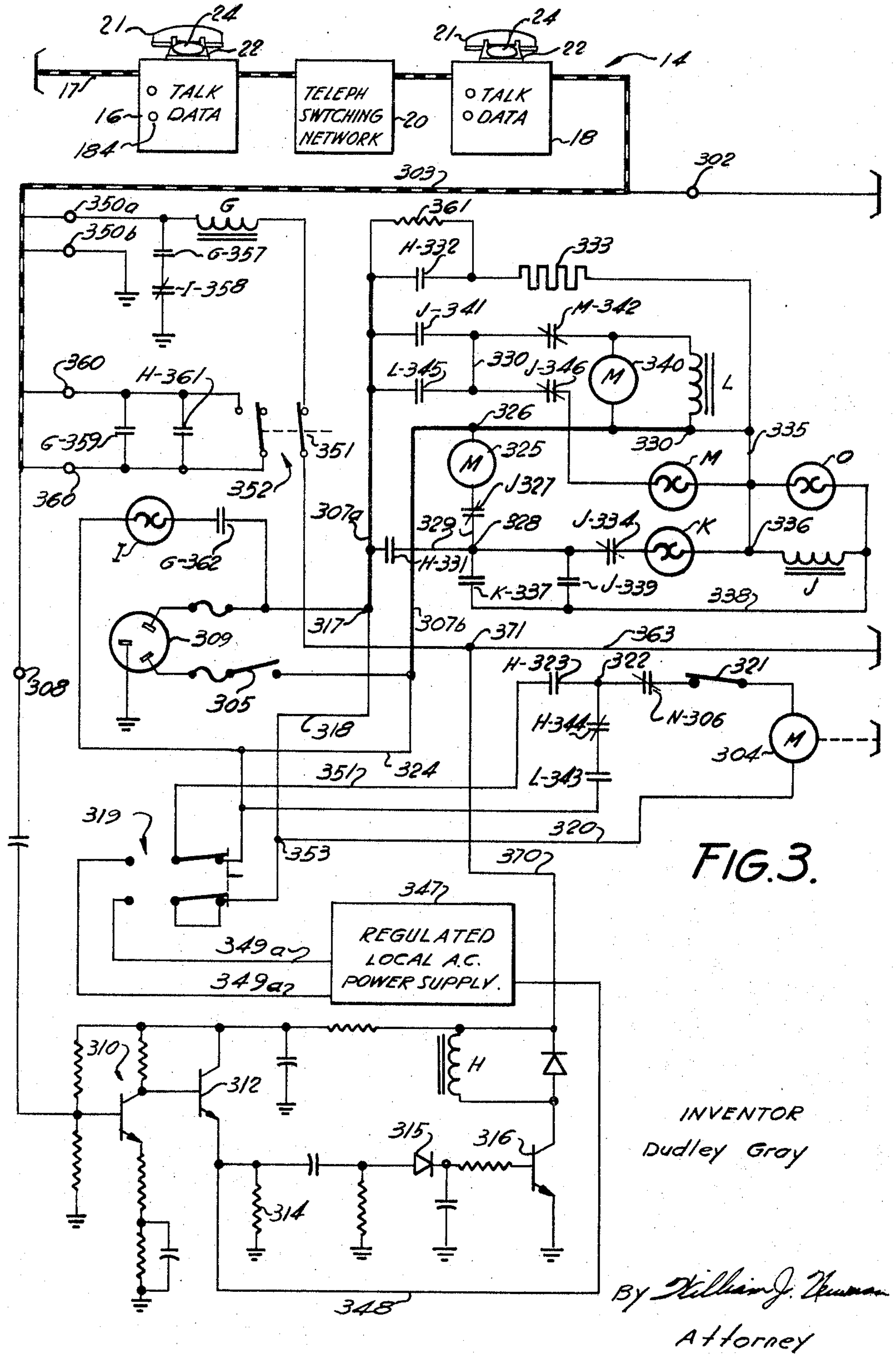
FIGS. 3 and 4 are schematic diagrams which, combined, show a facsimile receiver embodying the teachings of this invention.
Figure 4:
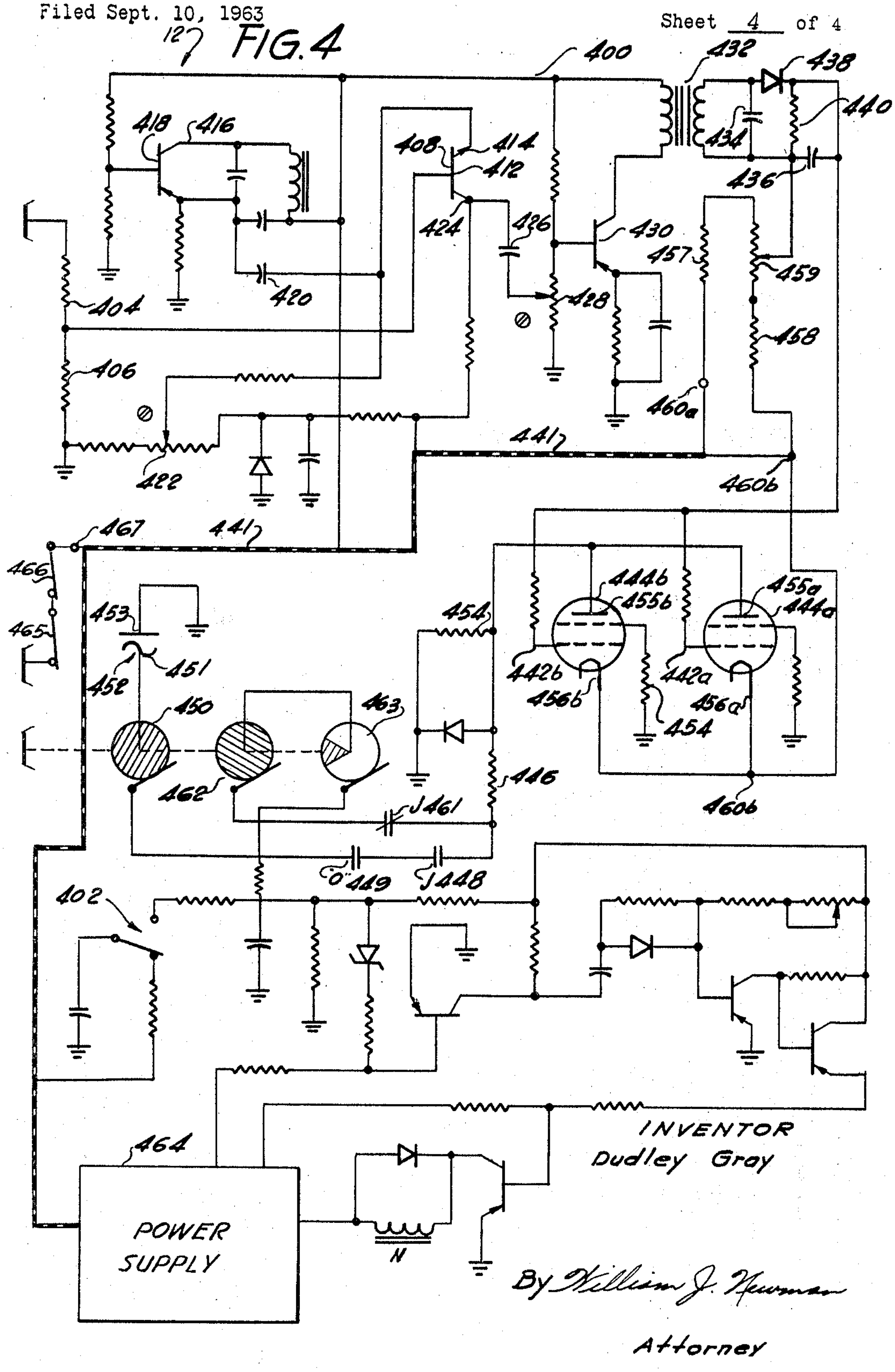

The facsimile system embodying the teachings of this invention comprises a facsimile transmitter 10 (FIGS. 1 and 2) and a facsimile receiver 12 (FIGS. 3 and 4). These units are adapted for interconnection with a telephone data transmission system 14 (FIG. 3) which includes data handling phone sets 16 and 18 associated with the transmitter 10 and receiver 12, respectively. The phone sets are interconnectible through the existing telephone switching network 20 by the ordinary procedures. Each phone set includes a hand piece 21 which sits on a cradle 22 and means 24 for dialing the station code to make the desired connection. The facsimile transmitter and receiver shown in these drawings are specifically adapted for use with phone sets 16, 18 of the type supplied by Bell Telephone Companies under their Model No. 602A and trade name "Dataphone."

Figure 1:
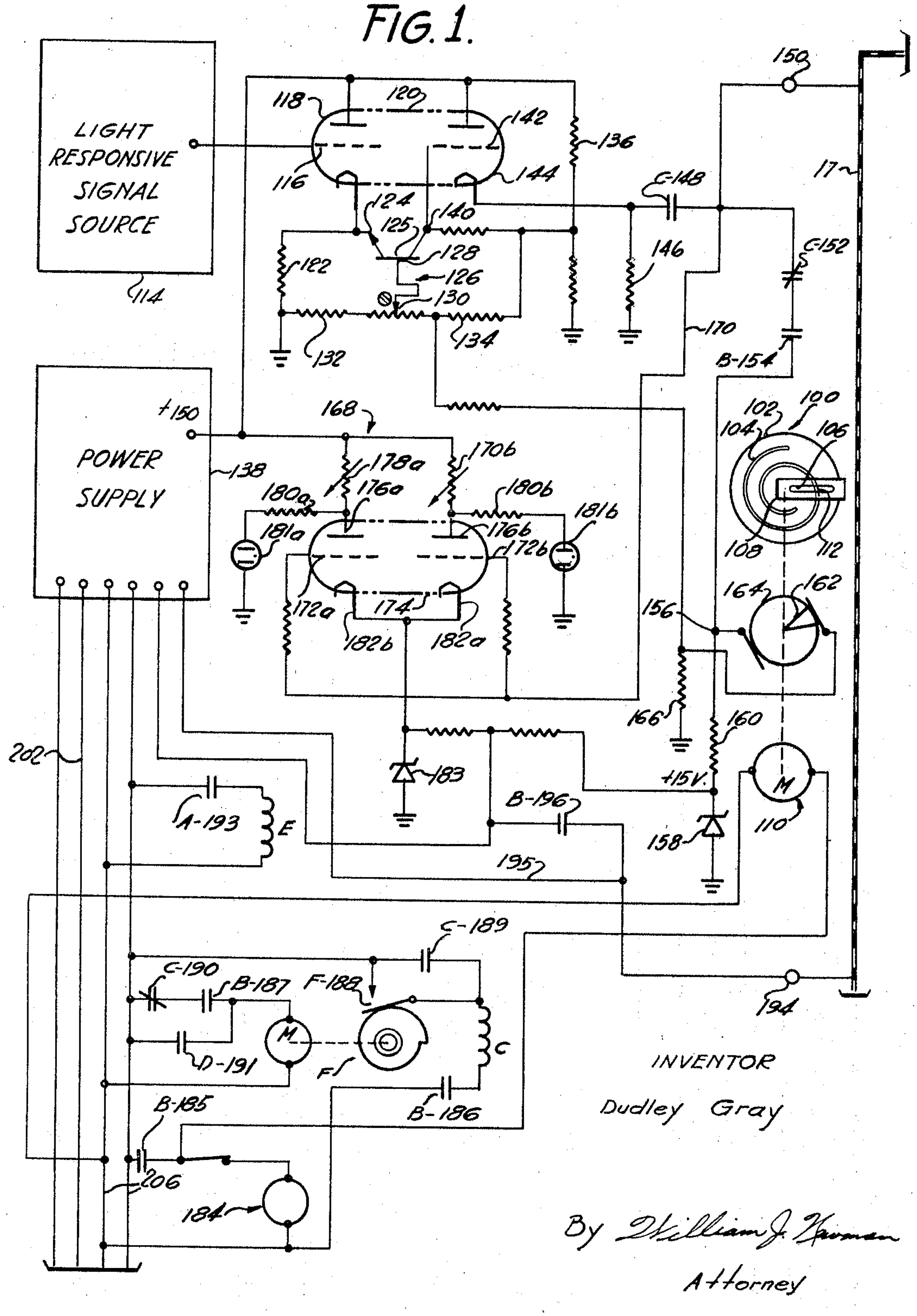
FIGS. 1 and 2 are schematic diagrams which, combined, show a facsimile transmitter embodying the teachings of this invention.

Reference is now made to FIGS. 1 and 2 for a detailed description of the facsimile transmitter. There is shown a well known type of scanner unit 100 which includes an ojaque disk 102 having a spiral slit 104 intersecting a linear slit 106 in a stationary opaque member 108. The disk 102 is rotatable by means of a synchronous motor 110 so that the opening 112 formed by the interseting slits 106 and 104 forms a linear and repetitive scan moving along the length of slit 106. The scanning unit 100 is interposed between the document to be copied (not shown) and a light repsonsive signal source 114 so that light reflected from the document and passing through the opening 112 in the scanning unit 100 impinges on the light responsive signal source to produce a varying electric current in response to the reflectivity of the scanned spot on the document.

The light responsive signal source 114 may be an ordinary photomultiplier or may be a semiconductor-type light responsive element. The output of the signal source 114 is fed to the grid 116 of a cathode follower section 118 of a duotriode vacuum tube 120. The output of the cathode follower circuit 118 taken across the cathode resistor 122 is applied to the emitter 124 of an NPN transistor 125 connected as a common base amplifier 126. The proper bias voltage is supplied to the base 128 of transistor 125 by means of a potentiometer 130 which forms a part of a voltage divider including resistors 132, 134 and 136 connected between ground and plus 150 volts in power supply 138. The output of the common base amplifier 126 at the collector 140 of the transistor 125 is applied to the grid 142 of the other cathode follower section 144 of the tube 120. The output of the cathode follower 144 taken across cathode resistor 146 is applied through relay contacts C148 of a video relay C to a video output terminal 150 connected directly to the transmitter phone set 16 (FIG. 3) by cable 17.

The signal at the video output terminal 150 is a pulsating DC signal which may vary, for example, from a level of +14 volts for a black scanned spot on the document to a +6 volts for a white scanned spot. These signal voltages are derived from the output of the signal source 114 which may vary from a noise level on black of about −50 millivolts to about −400 millivolts on white. They are amplified and translated without inversion through the two cathode followers coupled by the common base NPN transistor amplifier. The varying voltage arcoss the first cathode resistor 122 changes the bias on the transistor 125 causing an inversely proportional change in its collector current. The change in voltage at the input to the cathode follower 144 therefore is proportional to the change at the first cathode resistor 122 and the change in the output at terminal 150 is likewise proportional thereto. It is to be understood that the voltage values mentioned herein are merely representative and may be readily changed if the telephone company's equipment so dictates.

Adjustment of the output black level is accomplished by adjusting the base emitter voltage of transistor 125 to near cut off value with the potentiometer 130 with no input to the first cathode follower 118 (corresponding to a black or 50 millivolts noise signal input). Adjustment of the white level may be accomplished by varying the gain of the light responsive signal source which in the case of a photomultiplier may be done by varying the accelerator voltage with a white level control potentiometer, or the like.

At the beginning of each transmission there is provided a phasing period required to synchronize the scanning transducer in the receiver with the scanning unit 100 in the transmitter. This is accomplished by transmitting a phasing signal which may comprise a black level signal with intermittent white level signals, each pulse corresponding to one revolution of the scanning disk 102 in a manner well known in the art.

The phasing signal is applied to the video output terminal 150 through the normally closed contact C152 of the video relay C and normally open contact B154 of the transmit relay B. These contacts cooperate with contacts C148 to connect phasing signal generator circuits 156 to the output terminal 150 during the first portion of the transmisstion while maintaining the video circuits disconnected from the terminal. After a predetermined time interval the phasing circuits are disconnected and the video signal circuits are connected to the video output terminals.

The phasing signal is derived from the generating circuit 156 in the following manner. Contacts B154 and C152 are closed during the phasing period so that the video output terminal 150 is connected through resistor 160 to a black level voltage of perhaps 15 volts developed across a Zener diode 158. However, during a short portion of the cycle the output terminal is connected through a conducting segment 162 on keying commutator 164 and a resistor 166 to ground. Thus, during the short portion of the cycle represented by the conducting segment 162 the voltage developed across the Zener diode 158 is divided between resistors 160 and 166, and the voltage at the video output terminal 150 is dropped to a white level of +6 volts.

A signal monitor circuit 168 is provided to establish that the peaks of the video signal are producing a white level output lying between arbitrarily selected limits above and below the nominal white level. The signal appearing at the video output terminal 150 is applied through line 170 to the grids 172*a* and 172*b* of the two sections of duotriode tube 174. Each of the plates 176*a* and *b* are connected to the power supply through potentiometers 178*a* and *b*, respectively. A neon bulb 181*a* or *b* is connected to the respective plate 176*a* or *b* through a dropping resistor 180*a* or *b*. The cathodes 182*a* and *b* are stabilized by means of a Zener diode 183. The circuits are adjusted by means of the potentiometers 178*a* and 178*b* so that neon bulb 181*a* will light when the grids 172*a* and *b* and receive a signal level of perhaps 6½ volts and neon bulb 181*b* will light when the grids 172*a* and *b* receive a signal of perhaps 5½ volts from the video output. Thus, if both lamps 181*a* and 181*b* are not lit the voltage is too low, and if both lamps are lit the voltage at the video output is too high. However, if bulb 181*b* is not lit and bulb 181*a* is blinking the voltage level of the white signal is proper.

The facsimile transmitter 10 is designed for automatic operation responsive to the insertion of the document after the call has been established between the two telephone stations. That is, the connection between the two stations is made in the ordinary manner by lifting the hand set 21 off the cradle 22 at the transmitter phone set 16 and the number of the desired receiver station is dialed. When the document is to be transmitted the caller presses the data function button 184 on the transmitter phone set 16 and inserts the document into the transmitter.

The leading edge of the document inserted into the transmitter trips a document switch 200 (FIG. 2) to light a document indicator lamp 203 and initiate the control sequence which begins with the phasing mode interval. The closure of document switch 200 completes the circuit to document relay A through a circuit from ground, document switch 200, document relay A, or lamp 203, line 202 to a low AC voltage in power supply 138. Document relay A pulls in its contacts A204 in the energization circuit of the alternating current transmit relay B to connect it across the normal AC current supply lines 206. The transmit relay B locks itself by means of a holding circuit including its contacts B208 and contacts F210 associated with a timing motor F (FIG. 1), the purpose of which will be hereinafter described.

The actuation of transmit relay B initiates a number of operations including the energization of scanning drive motor 110 (FIG. 1) and the copyfeed motor 184 through the closure of contacts B185. As previously mentioned the commutator 164 driven by the scanning motor 110 produces the phasing signal and the closure of contacts B154 in the line between the phasing signal generator 156 and the video output terminal 150 cause the phasing signals to be transmitted therefrom through the telephone data transmission system 14 to the connected receiver. The transmission relay B also prepares a circuit to video relay C (FIG. 1) by means of contacts B186.

In addition to the above, relay B completes a circuit for timing motor F across the AC lines 206 by closing contacts B187. The time period governed by the timing motor F should be sufficient for phasing the equipment and is preferably approximately equal to the time required for the leading edge of the inserted document to pass from the document switch to the scanner. Therefore, a predetermined time interval, for example 26 seconds, after the start of timing motor F its contacts F188 close to complete a circuit across the AC lines 206 for the video relay C. The operation of video relay C establishes the end of the phasing mode and the beginning of the video mode. That is, it disconnects the phasing signal generator 156 from output terminal 150 and connects the video signal circuits thereto by opening the normally closed contacts C152 and closing the contacts C148, respectively, to the video output terminal 150. The video relay C holds itself energized through contacts C189 and also opens the circuit to the timing motor F by means of its normally closed contacts C190.

The apparatus is now in the video or document transmitting mode. The transmitter includes an automatic stop feature to return all of the circuits to a standby condition after the document has been fully scanned and no further documents are inserted for reproduction. The operation of video relay C at the beginning of the video mode prepared a circuit through contact C210 (FIG. 2) and automatic stop selector switch 212 for standby return relay D across the AC supply lines 206. The standby return relay D, however, was not energized in view of the open condition of normally closed document relay contacts A212. When the trailing edge of the document passes the document switch 200, however, the standby return relay D energizes to pull in its contacts D191 (FIG. 1) and complete another circuit to the timing motor F across the AC lines 206. Approximately 26 seconds after the leading edge passes the document switch to reach the scanning unit 100, the timing motor contacts F210 in the holding circuit for the transmit relay B open, relasing it. Contacts B185 in the circuits for the drive and copyfeed motors 110, 184, respectively, and contacts B186 in the circuit for video relay C also open so as to place the transmitter back into the same condition it was before the document was inserted.

If another document was inserted into the transmitter so as to trip the document switch 200 and energize relay A before the timing motor F opened its contacts F210 in the transmit relay B holding circuit, the transmit relay would not deenergize because the reclosed document relay contacts A204 serve to maintain the circuit across the AC lines 206.

With the automatic stop switch 212 in its "open" or "off" position the transmitter never returns to standby condition after the first document has been inserted. The standby return relay D is disenabled by the automatic stop switch 212 so that it never operates to reset the timing motor F which, it will be remembered, opens the hold circuit to the transmit relay D 26 seconds after passage of the document trailing edge from the document switch 200 in the automatic operation.

The automatic stop feature hereinbefore described permits the transmitter to be disconnected from the line and the call completed a minimum time after the completion of reproducing the last document. This of course is especially important since the telephone company bases its charges on the elapsed time use of the telephone lines. This feature coupled with the previously discussed feature by which the phasing period runs concurrently with the runup of the document from the document switch to the scanning unit 100 provides a most efficient operating device enabling maximum facsimile transmission for minimum time use of the telephone lines.

The closure of document switch 200 and the resultant energization of document relay A causes an auxiliary function responsive to the insertion of the first document into the transmitter. That is, the DC energizing potential of the fluorescent lamps 214 is reversed. The polarity reversal of the ionizing voltages in the lamps 214 is desirable to prevent darkening of one end of fluorescent lamps resulting from mercury pumping. This phenomenon is caused by constant polarity ionizing voltages and is discussed more fully in copending application of Robert Benson et al., Ser. No. 82,568, filed Jan. 13, 1961, now U.S. Patent No. 3,198,982.

As may be seen in FIG. 2 the filaments 216*a* and 216*b* are energized by means of a transformer 218 having its primary 220 connected across the AC power lines 206. The ionizing voltages are derived from line 222 supplying a high DC potential with polarities dictated by the states of contacts E224, E226, E228 and E230 of latch-type, polarity reversal relay E (FIG. 1). The latch-type polarity reversal relay E pulls in each time document relay A operates causing the closure of contacts A193 in the energization circuit for relay E.

The contacts E224 through E230 are thereby set to provide ground on one set of filaments (for example 216*a*) and the high voltage from the power supply on the other set of filaments (for example 216*b*). Since the polarity reversal relay E is a latch-type, the contacts E224 through E230 are not disturbed when the passing of a document causes the deenergization of relay E. The next document, however, energizing relay E causes the contacts E224 to E230 to assume their opposite condition and switch the polarities of the DC ionizing potential on the filaments 216*a* and 216*b*. It is to be noted that there is a contact C232 in the ionizing circuit leading to filaments 216*b* which is operable by the video relay C (FIG. 1). It will be remembered that the video relay operates after a predetermined time interval determined by timing motor F to switch the transmitter from the phasing mode to the video mode. The lamps are, therefore, lit only during the period when the transmitter is in the video or document transmitting condition and are deenergized during the phasing mode of operation.

Referring again to FIG. 1 the transmitter has a terminal 194 which provides an indicator signal to the transmitter phone set 16 through cable 17. When the transmitter is in a standby condition with the power supply turned on but no document inserted, a negative voltage is applied to the ready-to-send terminal 194 through line 195 from the power supply 138. However, when a document is inserted the transmit relay B closes a contact B196 to place a positive voltage at the ready-to-send terminal 194. The polarity reversal from negative to positive at terminal 194 is sensed by the transmitter phone set 16, in a manner not shown, to turn on a carrier signal for modulation by the fluctuating DC output signal at terminal 150.

The transmitter phone set 16 also sends signals back to the transmitter 10 at the carrier detect terminal 234 through cable 17 indicating its state. If the phone set 16 has its power turned on a negative potential appears at carrier detect terminal 234 which causes transistor 244 to conduct. The collector current through the transistor 244 passes through ready lamp 246, diode 248 and resistor 250 to the low AC voltage line 202 to cause the lamp 246 to flash a ready signal. The potential at terminal 234 is changed to positive by the phone set 16 when the carrier is turned on responsive to the polarity shift signal supplied from the ready-to-send terminal 194. The positive signal at terminal 234 cuts off the transistor 244 extinguishing ready lamp 246 and biases transistor 252 to conduction to light a send lamp 254 by means of the circuit through diode 256 and resistor 250. The flashing send signal indicates that the carrier in the phone set 16 has been turned on since the positive polarity signal appearing at terminal 234 is dependent upon the proper operation of the carrier generator in the phone set.

A fourth terminal 258 in the transmitter is connected through resistor 260 to the low voltage AC line 202. This provides a sample AC signal which is transmitted along with the facsimile signals through the telephone networks to the receiver where it is used to synchronize a local power supply with the transmitter AC source. This is especially important when the transmitter and the remote receiver are operating from different power systems which may be at slightly different frequencies and/or different phases. If the receiver and the transmitter were not synchronized it is evident that distortions might appear which would render the reproduced copy at the receiver unintelligible.

Reference is now made to FIGS. 3 and 4 for a detailed description of a facsimile receiver for use with the telephone facsimile transmission system. The signal handling circuits 400 and the phasing circuits 402 are shown in FIG. 4 while the control circuits 300 are shown primarily in FIG. 3.

Considering first the signal handling circuits, a pulsating DC signal appears at video input terminal 302 (FIG. 3) which is essentially the same as the signal appearing at the video output terminal 150 of the transmitter. It will be recalled that the signal output from the transmitter is used to frequency modulate a carrier in the transmitter phone set 16 and the modulated carrier is transmitted through the telephone switching network 20 to the receiver phone set 18. The demodulated signal, therefore, appears at input terminal 302 where it is demodulated.

The signal at terminal 302 is applied to a voltage divider formed by resistors 404 and 406 with the portion appearing across resistor 406 appearing at the base 408 of a modulator amplifier transistor 412. The fluctuating DC voltage appearing at the base 408 varies the gain of transistor 412 so as to modulate a subcarrier oscillating signal supplied to the emitter 414 thereof from an oscillator 418. The oscillator 418 may be of any well known type such as the Colpitts arrangement shown at 416. The oscillator output from the emitter of transistor 418 is fed through blocking capacitor 420 to the emitter of transistor 412 to provide a collector current fluctuating at the resonant frequency of the oscillator with an amplitude characteristic fluctuating in accordance with the video signals applied to the base 408.

The emitter to base bias is adjusted by means of potentiometer 422 so that the collector current is zero with a +6 volt white signal at the video input terminal 302. It will be recalled that a black signal is represented by a signal of approximately +14 volts so that the gain of transistor 412 is varied from zero to maximum by the incoming signal in proportion to a copy density gradient ranging from wihte to black, respectively.

The amplitude modulated signal appearing at the collector 424 of transistor 412 is transmitted through blocking capacitor 426 to potentiometer 428. The potentiometer 428 serves as a black adjustment which is manipulated to provide a black mark on the recording medium when a maximum signal 14 volts appears at the video input terminal 302. A common emitter transistor 430 amplifies the modulated subcarrier signal in the normal fashion and applies it to the primary of a resonant transformer 432.

The signal is detected and rectified in the secondary circuit of the transformer 432 which includes capacitors 434, 436, diode 438 and resistor 440. The resultant appears at the grids 442*a* and 442*b* of parallel connected vacuum tubes 444*a* and 444*b*. The amplified output at the plates 455*a* and *b* of the parallel connected tubes 444*a* and *b* is applicable through resistor 446, contacts J448 of a phasing lockout relay J (FIG. 3), contacts O449 of a two second time delay relay O (FIG. 3) and commutator 450 to the helix electrode 451 of a well known type of scanner marking transducer 452. The helix 451 is rotated with respect to a linear stationary printer bar 453 by means of a drive motor 304 (FIG. 3) so that a linear sweep is provided across a recording medium passing therebetween. The voltage variations supplied by the marking signal circuits 400 on the helix electrode 451 with respect to the grounded printer bar 453 cause metallic deposits on the recording medium of a density corresponding to the voltage difference.

A desirable feature of the signal circuits hereinbefore described lies in the fact that the printer bar 453 and the helix electrode 451 are maintained at essentially ground potential when the signal circuits 400 are receiving no marking or phasing signals. The receiver attendant is, therefore, not subjected to high potentials when working with the scanner transducer 452. It will be noted that even when contacts O449 and J448 are closed the helix electrode 451 is at ground potential in view of the load resistor 454 connected between the plates 455*a* and *b* of the tubes 444*a* and *b* and ground.

Since the plates of the tubes 444*a* and *b* are essentially grounded through resistor 454 it is necessary that high negative voltages appear in the cathode and grid circuits for proper operation. The negative voltages are supplied by cable 441 from the power supply 464. A voltage divider comprising resistors 457 and 458 in series with potentiometer 459 is connected between two negative potentials —300 volts and —200 volts at points 460*a* and 460*g* respectively. Thus the cathodes 456*a* and *b* are maintained at —200 volts while the grids 442*a* and *g* are maintained at approximately —240 volts in the absence of an input signal.

The high negative voltage appearing in the grid circuits of the parallel tubes must be isolated from the low value positive voltages appearing at the receiver input. It is for this reason that the subcarrier oscillator 416 is used as a modulating medium for the input signal. That is, the low level signals in the receiver stages are amplified and subtracted from the highly negative voltage appearing at grids 442*a* and *b* by using the combination of modulated subcarrier, the D-C isolation inherent in transformer 432 and diode detector 438.

Referring now to the phasing operation of the receiver, the phasing signal circuits operate to synchronize the marking scanner 452 with the document scanner in the transmitter in a manner well known in the art as shown in U.S. Patent No. 3,013,121 issued to R. W. Castor, Dec. 12, 1961. Hence it will not be described in detail. Briefly, however, the phasing signals are transmitted during the phasing period at the beginning of transmission from the video input terminal at 302 through the signal circuits 400 to the output across load resistor 454. From there the signals are conducted through normally closed contact J461 of the nonoperated phasing lockout relay J and commutators 462 and 463 to the circuits 402 which drive phasing relay N. Phasing relay N has a contact N306 in the energization circuit for drive motor 304 which rotates the helix in the marking transducer 452. If the commutator 463 is out of phase with the pulses in the phasing signal, the phasing relay N is caused to pulse once for each revolution of the commutator and open its contacts N306 (FIG. 3) in the energization circuit for synchronous drive motor 304. The motor slips back one pole each pulse until the scanner transducer 452 is properly phased with the transmitter scanner unit 100.

Reference is now made to FIG. 3 for a detailed description of the receiver control circuits 300. It is first assumed that the power in the receiver has been turned on by switch 305 to connect lines 307*a* and *b* to AC source plug 309. The control functions of the receiver are initiated by the presence of an alternating signal at the synchronous signal input terminal 308 supplied by cable 303 from phone set 18. It will be recalled that the transmitter provides a low voltage AC signal at its synchronous signal output terminal 258 when it is in the ready condition. As soon as a call has been established between the transmitter station and the receiver station through the telephone switching network 20 and the two phone sets 16 and 18 have been switched to the data function, the synchronizing signal is transmitted through the telephone system 14 to appear at the synchronous input terminal 308. Transistor amplifier 310 amplifies the signal and passes it on to emitter follower 312. The output across emitter resistor 314 is rectified by diode 315 and applied to grounded emitter amplifier 316 causing it to conduct. The current therethrough energizes enabling relay H through a circuit to be described hereinafter to start the control functions.

The energization of enabling relay H closes a circuit across the AC lines 307*a* and *b* for the drive motor 304 to operate the scanner transducer 452 and to drive the recording paper through the receiver. The motor circuit may be traced from junction 317 with AC line 307*a*, conductor 318, junction 353, conductor 320, motor 304, door interlock switch 321, phasing relay contacts N306, junction 322, enabling relay contacts H323, switch 319, conductor 324 to the other AC line 307*b*.

The enabling relay H also activates a fast paper feed motor 325 through a circuit from junction 326 on AC power line 307*b*, through motor 325, contacts J327, junction 328 and enabling relay contacts H331 to the other power line 307*a*. The fast paper feed operates during the initial 26 second phasing period as will be hereinafter described to introduce fresh recording paper to the scanner after the apparatus has been sitting idle for a period of time. For further details see the copending application of M. W. LaRue, Jr., Ser. No. 262,594, filed Mar. 4, 1963 now U.S. Patent No. 3,240,871.

In addition, enabling relay contacts H332 complete a circuit for increasing the current flow to heater bar 333 by shorting out resistance 361 in series therewith. The heater bar is used to dry the moist recording medium after the scanning transducer 452 has recorded the reproduction markings thereon.

The enabling relay contacts H331 also complete a circuit to a 26 second time delay relay K, the circuit leading from the line 307*a* through contacts H331, junction 328, normally closed contacts J334 of phasing lockout relay J, time delay relay K, junction 336 and conductor 335 to the other power line 307*b*. The 26 second interval during which the time delay relay K is operating represents the phasing period of the receiver. It will be recalled that during this time the phasing signals generated by the phasing signal generator 156 in the transmitter cause the phasing circuits 402 in the receiver to synchronize the receiver drive motor 304 with the transmitter.

At the conclusion of the 26 second interval time delay relay K closes its contacts K337 to complete a circuit for the phasing lockout relay J through a circuit comprising contacts H331, junction 328, timed delay relay contact K337, conductor 338, phasing lockout relay J, junction 336, and conductor 335 with AC power line 307*b*.

The primary function of the phasing lockout relay J is to disconnect the phasing circuits 402 from the output of signal circuits 400 and to prepare the circuit between the signal circuits 400 and the scanner marking transducer 452. That is, contacts J461 (FIG. 4) open to disenable the phasing signal and contacts J448 close but the signal circuit connection is not completed to the marking transducer 452 until contacts O449 are closed. Contacts O449 are closed two seconds after the operation of phasing lockout relay J by a 2 second time delay relay O in parallel connection across the phasing lockout relay J.

The 2 second delay between the disconnection of the phasing signal circuits and the connection of the marking signal circuit insures that the phasing signals received from the transmitter will not mark the recording medium. It will be recalled that the phasing signal comprises intervals of black level voltage with periodic pulses of white level voltage. If permitted, the extended black intervals would cause dark marks across the paper which may weaken or even tear the paper.

The phasing lockout relay J locks itself by means of contacts J339 in parallel with the 26 second time delay relay contacts K337, and it also opens the circuit to the fast paper feed motor 325 by opening contacts J327 in series with the motor. Normally closed contacts J334 are opened by phasing lockout relay J to open the circuit to the time delay relay K.

Relay J also closes a circuit for a copy runout relay L as well as a cooling fan motor 340 in parallel therewith, by means of contacts J341 in the circuit leading from AC line 307*a*, contacts J341, normally closed contacts M342 of a 4 minute time delay relay M, the parallelly connected motor 340 and copy runout relay L, and junction 326 with the other power line 307*b*. The copy runout relay L closes contacts L345 to lock itself against subsequent deenergization of relay J and also to prepare an energization circuit for the 4 minute time delay relay M. Time delay relay M is not activated at this time in view of the normally closed contacts J346 in its circuit which were opened by the phasing lockout relay J.

The copy runout relay L also closes contacts L343 in an auxiliary energization circuit for drive motor 304. However, that closure has no effect at this time in view of the normally closed contacts H344 which were opened by the enabling relay H at the first receipt of the sync signal to the receiver.

The receiver is now in the video mode for receiving the facsimile data signals to mark the recording paper in accordance with the scanned document at the transmitter. The receiver stays in the video mode as long as the enabling relay H remains energized by the receipt of a synchronizing signal from the transmitter.

At the end of transmission of the last document in the transmitter, however, the synchronizing signal to the transmitter phone set 16 is cut off and no longer appears at the synchronous input terminal 308 in the receiver to maintain the enabling relay H energized. The deenergization of enabling relay H opens contacts H331 causing the release of phasing lockout relay J.

The 4 minute time delay relay M is initiated by the fallback of phasing lockout relay J which completes the circuit including power line 307*a*, copy lockout relay contacts L345, normally closed phasing lockout contacts J346, time delay relay M, conductor 335 and power line 307*b*. Four minutes after the termination of receipt of the synchronizing signal, the copy lockout relay L is deenergized by the opening of time delay relay contacts M342 in its holding circuit. Copy runout relay contacts L345 open the circuit to the 4 minute time delay relay M and contacts L343 open the auxiliary energization circuit for the drive motor 304 to stop the scanner marking transducer 452 and discontinue the movement of the recording paper through the receiver. The 4 minute interval governed by the time delay relay M represents the time required for the end of the reproduced document to pass from the scanner marking transducer 452, past the heater bar 333 and out of the reeciver housing.

The described operation of the receiver to this point contemplated that the transmitter and receiver are both situated within an area served by the same electric power source. Thus, the frequency and phase of the AC power received at receiver source plug 309 are identical to the frequency and phase of the transmitter power supply. Therefore, the drive motor 304 in the receiver operates at the same speed as the copyfeed motor 184 and the scanning motor 110 in the transmitter and may be properly phased therewith.

If, however, the receiver is located at a remote location which is not served by the same power source, a regulated local power supply 347 is required. The regulated local AC power supply 347 produces a power output which is synchronized by means of a synchronous signal received over the telephone facsimile data transmission network 14 at the receiver terminal 308 and the synchronized power output therefrom is used to energize the drive motor 304. A portion of the received synchronous signal is taken from the output of the emitter follower circuit 312 by means of conductor 348 and is applied to the regulated local power supply 347 to synchronize the output thereof on line 349*a* and *b* with the AC power in the transmitter. The regulated output on lines 349*a* and *b* are applicable to the drive motor at 304 when the d.p.d.t. switch 319 is in the opposite position shown in FIG. 3. The operating circuits for the drive motor 304 operate in the same manner as previously described by the closure of contacts H323 to actuate it when the enabling relay H is pulled in responsive to the synchronizing signal.

Since the regulated local power supply will have no output when the synchronizing signal is not applied thereto, provisions must be made for operating the drive motor after the synchronizing signal has been discontinued in order to drive the reproduced document out of the receiver. It will be recalled that in the previous case the 4 minute time delay relay M caused the drive motor 304 to operate from the normal AC supply for 4 minutes after the cessation of the video and synchronous signals for this purpose. In this case, however, the regulated power supply signal is lost at the end of transmission. Therefore, during the phasing and video modes, the drive motor is connected to the regulated local power supply through the circuits comprising conductor 349*a*, d.p.d.t. switch 319, conductor 351, enabling relay contacts H323, junction 322, phasing relay contacts N306, door interlock switch 321, drive motor 304, conductor 320, d.p.d.t. switch 319 and line 349*b*. This circuit is broken by enabling relay contacts H323 at the end of document transmission, but the auxiliary circuit from junction 322 is completed by the remaking of contacts H344 through the contacts L343 which are held closed by the copy runout relay L for the 4 minute interval. Thus, during this 4 minute period the drive motor 304 is energized over the local unregulated supply at receptacle 309 by means of the circuit including power line 307*a*, junction 317, conductor 318, junction 353, conductor 320, motor 304, door interlock 321, phasing relay contacts N306, junction 322, normally closed contacts H344, copy relay runout contacts L343, conductor 324 and AC power line 307*b*.

The receiver is provided with an automatic answering feature which enables a party desiring to transmit a document to reach a receiver at a remote location even though the receiver is unattended. For example, it might be desirable to transmit a number of documents during the night hours or on week-ends when the telephone rates are reduced. The automatic answering feature permits this to be done without requiring an attendant at the receiver station.

The receiver is provided with a set of ring indicator terminals 350*a* and *b*. When a call is placed to the receiver station 14, the circuit which rings the signal bell in the phone set 18 also completes a circuit across terminals 350*a* and *b* for the answering relay G (FIG. 3). This circuit may be traced from ground through termnial 350*b*, cable 303, phone set 18, cable 303, terminal 350*a*, answering relay G, contact set 351 of answering switch 352, conductor 363, a no-paper switch 465 (FIG. 4), door interlock switch 466 and junction 467 with the DC power line 441.

Answering relay G closes its contacts G357 to complete a holding circuit through contacts I358 of a false call relay I to be explained hereinafter. The answering relay G also closes contacts G359 to complete a circuit within the receiver phone set 18 which includes terminals 360. The closure of the circuit across terminals 360 causes a tone signal to be relayed from the receiver phone set 18 back through the telephone switching network 20 to the transmitter phone set 16. The tone signal indicates to the operator at the transmitter that the call has been received at the receiver station. The transmitter operator then places his phone set in the data mode by pressing his button 184 and inserting a document into the transmitter. When the document is inserted the synchronizing signal is transmitted through the telephone system and is received at the synchronous signal input terminal 308 to cause the enabling relay H to pull in as hereinbefore described. The enabling relay H has a set of contacts H361 in parallel with the answering relay contacts G359 across the answer terminals 360 to maintain the answering signal and hold the call in a manner substantially the same as an ordinary phone when the hand set is held off of its cradle during a call.

The answering relay G also closes contacts G362 in an obvious energization circuit for false call relay I (FIG. 3). The false call relay I is a 2½ minute time delay relay which functions to release the receiver if the receiver station has been called by a person dialing a wrong number. That is, if a person reaches the receiver station by dialing the wrong number, he will hear only the answering signal provided by the closure of answering relay contacts G359 across the answer terminals 360 and will presumably hang up his phone. Two and one half minutes after the false call is received, the false call relay I momentarily opens its contacts I358 in the holding circuit for answering relay G thus releasing it from the line. The control circuits are never operated of course because a sync signal is not received.

As hereinbefore described, the answering relay G is energized through the no-paper switch 465 when a call is placed to the receiver station. The no-paper switch 465 is caused to open, however, when the supply of recording paper in the receiver is exhausted. Thus, the receiver cannot answer a call if there is no paper on which to record and the calling party is saved the expense of a telephone call which would have produced no reproduction copy at the receiver. The door interlock switch 466 also prevents the call from being answered because it, too, causes the receiver to be inoperable.

The no-paper switch 465 and the door interlock switch 466 are also in the energization circuit for enabling relay H. This circuit may be traced from ground through the emitter and collector of transistor 316 (FIG. 3), relay H, conductor 370, junction 371, conductor 363, no-paper switch 465, door interlock switch 466, and junction 467 with the D.C. power line 441. This insures that marking signals will never reach the scanner marking transducer 452 if the paper supply is exhausted or the receiver is otherwise rendered inoperable. This is the circuit for energizing the enabling relay H previously mentioned and this circuit also provides the DC power for the transistor amplifiers 310, 312 and 216.

While there has been shown a preferred embodiment of a facsimile system including a transmitter and receiver for use with telephone facsimile data transmission systems, it is to be understood that many modifications may be made thereto without departing from the intent or spirit of the invention. It is, therefore, intended that the applicant be bound only by the subject matter embodied in the accompanying claims.

What is claimed is:

1. In a facsimile transmitter of the type having copy drive means, a copy scanner, means for producing phasing signals and means for producing signals responsive to color density variations in the copy; operation control means comprising means responsive to the insertion of copy into said transmitter for actuating said copy drive means to move said copy toward said scanner and for simultaneously connecting said phasing signal means to the output of said transmitter, and timing means actuatable by said actuating and connecting means for disconnecting said phasing signal means and connecting said copy signal means to the output of said transmitter after a time interval approximating that required to move the copy to said scanner after insertion into the transmitter.

2. In a facsimile transmitter of the type having copy drive means, a copy scanner, means for producing phasing signals and means for producing signals responsive to color density variations in the copy; operation control means comprising means responsive to the insertion of copy into said transmitter for actuating said copy drive means to move said copy toward said scanner and for simultaneously connecting said phasing signal means to the output of said transmitter timing means actuatable by said actuating and connecting means for disconnecting said phasing signal means and connecting said copy signal means to the output of said transmitter after a time interval approximating that required to move the copy to said scanner after insertion into the transmitter and means operable responsive to the full insertion of said copy into said transmitter for reactivating said timing means to disconnect said copy signal means from the output of said transmitter after a predetermined time interval equal to said first time interval.

3. In a facsimile transmitter of the type having copy drive means, a copy scanner, means for producing phasing signals and means for producing signals responsive to color density variations in the copy, operation control means comprising means responsive to the insertion of copy into said transmitter for actuating said copy drive means to move said copy toward said scanner and for simultaneously connecting said phasing signal means to the output of said transmitter, timing means actuatable by said actuating and connecting means for disconnecting said phasing signal means and connecting said copy signal means to the output of said transmitter after a time interval approximating that required to move the copy to said scanner after insertion into the transmitter, means operable responsive to the full insertion of said copy into said transmitter for reactivating said timing means to disconnect said copy signal means from the output of said transmitter after a time interval equal to said first time interval and means for selectively disenabling said reactivating means.

4. In a facsimile transmitter of the type having copy drive means, a copy scanner, means for producing phasing signals and means producing signals responsive to color density variations in the copy, operation control means comprising a switch sensitive to the insertion of copy into said transmitter, a copy relay actuatable by said switch, a transmission relay actuatable by said copy relay and having a holding circuit, said transmission relay operable to actuate said copy drive means to move said copy towards said scanner and to simultaneously connect said phasing signal means to the output of said transmitter, timing means actuatable by said transmission relay and actuatable by said timing means for disconnecting said phasing signal means and connecting said copy signal means to the output of said transmitter after a time interval approximately that required to move the copy from said switch to said scanner.

5. In a facsimile transmitter of the type having copy drive means, a copy scanner, means for producing phasing signals and means producing signals responsive to color density variations in the copy; operation control means comprising a switch sensitive to the insertion of copy into said transmitter, a copy relay actuatable by said switch, a transmission relay actuatable by said copy relay and having a holding circuit, said transmission relay operable to actuate said copy drive means to move said copy toward said scanner and to simultaneously connect said phasing signal means to the output of said transmitter, timing means actuatable by said transmission relay, a video relay readied by said transmission relay and actuatable by said timing means for disconnecting said phasing signal means and connecting said copy signal means to the output of said transmitter after a time interval approximating that required to move the copy from said switch to said scanner, an automatic stop relay prepared by said video relay and actuatable by the deactuation of said copy relay after said copy has passed said copy sensitive switch, said automatic stop relay operable to reactivate said timing means, and normally closed contact means in the holding circuit of said transmission relay operable by said timing means after a time interval equal to said first time interval to release said transmission and video relays if another piece of copy does not actuate said switch during the second time interval.

6. In a facsimile transmitter of the type having copy drive means, a copy scanner, means for producing phasing signals and means producing signals responsive to color density variations in the copy; operation control means comprising a switch sensitive to the insertion of copy into said transmitter, a copy relay actuatable by said switch, a transmission relay actuatable by said copy relay and having a holding circuit, said transmission relay operable to actuate said copy drive means to move said copy towards said scanner and to simultaneously connect said phasing signal means to the output of said transmitter, timing means actuatable by said transmission relay, a video relay readied by said transmission relay and actuatable by said timing means for disconnecting said phasing signal means and connecting said copy signal means to the output of said transmitter after a time interval approximating that required to move the copy from said switch to said scanner, an automatic stop relay prepared by said video relay and actuatable by the deactuation of said copy relay after said copy has passed said copy sensitive switch, said automatic stop relay operable to reactivate said timing means, normally closed contact means in the holding circuit of said transmission relay operable by said timing means after a time interval equal to said first time interval to release said transmission or video relays if another piece of copy does not actuate said switch during the second time interval and a manually operable switch for selectively disenabling said automatic control relay.

7. In a facsimile transmitter for use with a telephone data transmission system, said transmitter being of the type having copy drive means, a copy scanner, means for producing phasing signals and means for producing signals responsive to color density variations in the copy; operation control means comprising means responsive to the insertion of copy into said transmitter for actuating said copy drive means to move said copy toward said scanner and for simultaneously connecting said phasing signal means to the output of said transmitter, means responsive to said actuating and connecting means for providing a transmit signal to said telephone data transmission system, and timing means actuatable by said actuating and connecting means for disconnecting said phasing signal means and connecting said copy signal means to the output of said transmitter after a time interval approximating that required to move the copy to said scanner after insertion into the transmitter.

8. In a facsimile transmitter for use with a telephone data transmission system, said transmitter being of the type having copy drive means, a copy scanner, means for producing phasing signals and means producing signals responsive to color density variations in the copy; operation control means comprising a switch sensitive to the insertion of copy into said transmitter, a copy relay actuatable by said switch, a transmission relay actuatable by said copy relay and having a holding circuit, said transmission relay operable to actuate said copy drive means to move said copy towards said scanner and to simultaneously connect said phasing signal means to the output of said transmitter, means operable by said transmission relay for providing a transient signal to said telephone data transmission system, timing means actuatable by said transmission relay, a video relay readied by said transmission relay and actuatable by said timing means for disconnecting said phasing signal means and connecting said copy signal means to the output of said transmitter after a time interval approximating that required to move the copy from said switch to said scanner, an automatic stop relay prepared by said video relay and actuatable by the deactuation of said copy relay after said copy has passed said copy sensitive switch, said automatic stop relay operable to reactivate said timing means, and normally closed contact means in the holding circuit of said transmission relay operable by said timing means after a time interval equal to said first time interval to release said transmission and video relays if another piece of copy does not actuate said switch during the second time interval.

9. In a facsimile receiver for use with a telephone data transmission system, means for automatically answering an incoming call comprising means responsive to the ringing signal of said incoming call for completing a circuit to provide an answering signal in said telephone system, timing means actuatable by said ringing signal for breaking said answering signal circuit after a predetermined short time interval, and means responsive to the receipt of a transmission of signal from said telephone system within said time interval for maintaining a completed circuit for the answering signal.

10. In a facsimile receiver for use with a telephone data transmission system, means for automatically answering an incoming call comprising an answering relay actuatable responsive to the ringing signal of said incoming call, said answering relay having a holding circuit and a set of normally open contacts in connection with said telephone system to complete a circuit for an answering signal in said telephone system, timing means initiated by said answering relay, a set of normally closed contacts in the holding circuit of said answering relay operable by said timing means, said set of normally closed contacts operable to deenergize said answering relay after a predetermined short interval, and means operable responsive to the receipt of a transmission signal at said receiver for maintaining said answering signal circuit completed if the transmission signal is received within said predetermined time interval.

11. In a facsimile receiver for use with a telephone data transmission system, means for automatically answering an incoming call comprising an answering relay actuatable responsive to the ringing signal of said incoming call, said answering relay having a holding circuit and a set of normally open contacts in connection with said telephone system to complete a circuit for an answering signal in said telephone system, a time delay relay initiated by said answering relay and having a set of normally closed contacts in the holding circuit of said answering relay, said set of normally closed contacts operable to deenergize said answering relay after a predetermined short interval, and means operable responsive to the receipt of a transmission signal at said receiver for maintaining said answering signal circuit completed if the transmission signal is received within said predetermined time interval.

12. In a facsimile receiver for use with a telephone data transmission system, means for automatically answering an incoming call comprising an answering relay actuatable responsive to the ringing signal of said incoming call, said answering relay having a holding circuit and a set of normally open contacts in connection with said telephone system to complete a circuit for an answering signal in said telephone system, a time delay relay initiated by said answering relay and having a set of normally closed contacts in the holding circuit of said answering relay, said set of normally closed contacts operable to deenergize said answering relay after a predetermined short interval, an enabling relay operable responsive to the receipt of a transmission signal at said receiver and having a set of normally open contacts connected in parallel across said answering relay set of contacts, whereby said incoming call is maintained if the transmission signal is received within said predetermined time interval.

13. In a facsimile receiver for use with a telephone data transmission system and containing a supply of recording paper, means for automatically answering an incoming call comprising means responsive to the ringing signal of said incoming call for completing a circuit to provide an answering signal in said telephone system, timing means actutable by said ringing signal for breaking said circuit answering signal circuit after a predetermined short time interval, means responsive to the receipt of a transmission signal from said telephone system within said time interval for maintaining a completed circuit for the answering signal, and means operative responsive to a short supply of recording paper for disenabling said circuit completing means.

14. In a facsimile receiver for use with a telephone data transmission system containing a supply of recording paper and having a service door, means for automatically answering an incoming call comprising means responsive to the ringing signal of said incoming call for completing a circuit to provide an answering signal in said telephone system, timing means actuatable by said ringing signal for breaking said circuit answering signal circuit after a predetermined short time interval, means responsive to the receipt of a transmission signal from said telephone system within said time interval for maintaining a completed circuit for the answering signal, means operative responsive to a short supply of paper for disabling said circuit completing means and means operative responsive to the opening of said service door for disabling said circuit completing means.

15. In a facsimile receiver for use with a telephone data transmission system, said receiver of the type having an electromechanical recorder, electronic circuitry for receiving and preparing transmission signals from said telephone system for said recorder, a supply of recording paper, means for driving said recorder and for driving said paper past said recorder, means for adjusting the phasing of said recorder, means for automatically answering an incoming call comprising means actuatable responsive to the ringing signal of the incoming call for completing a circuit for an answering signal in said telephone system, time delay means initiated by said circuit completing means for deenergizing said circuit completing means after a predetermined short time interval, enabling means operable responsive to the receipt of a transmission signal at said receiver for actuating said driving and phasing means and for maintaining said answering signal circuit completed for the duration of said call if the transmission signal is received within said predetermined time interval, and means operative responsive to a short paper supply for disabling said answering and enabling means to prevent the answering of an incoming call.

16. In a facsimile receiver for use with a telephone data transmission system and containing a source of recording paper means for automatically answering an incoming call to said receiver comprising an answering relay actuatable responsive to the ringing signal of an incoming call, said answering relay having a holding circuit and a set of normally open contacts in connection with said telephone system to complete a circuit for an answering signal in said telephone system, a time delay relay initiated by said answering relay and having a set of normally closed contacts in the holding circuit of said answering relay, said set of normally closed contacts operable to deenergize said answering relay after a predetermined short interval, and means including a set of switch contacts operative responsive to a short paper supply for disabling said answering relay.

17. In a facsimile receiver for use with a telephone data transmission system containing a source of recording paper and having a service door, means for automatically answering an incoming call to said receiver comprising an answering relay actuatable responsive to the ringing signal of an incoming call, said answering relay having a holding circuit and a set of normally open contacts in connection with said telephone system to complete a circuit for an answering signal in said telephone system, a time delay relay initiated by said answering relay and having a set of normally closed contacts in the holding circuit of said answering relay, said set of normally closed contacts operable to deenergize said answering relay after a predetermined short interval, means including a set of switch contacts operative responsive to a short paper supply for disabling said answering relay, and means operative responsive to the opening of said service door for disabling said answering relay.

18. In a facsimile receiver for use with a telephone data transmission system, said receiver of the type having an electromechanical recorder, electronic circuitry for receiving and preparing transmission signals from said telephone system for said recorder, a supply of recording paper, means for driving said recorder and for driving said paper past said recorder, means for adjusting the phasing of said recorder, a housing, and a service door in said housing: control means for said receiver comprising an answering relay actuatable responsive to the ringing signal of an incoming call, said answering relay having a holding circuit and a set of normally open contacts in connection with said telephone system to complete a circuit for an answering signal in said telephone system, a time delay relay initiated by said answering relay and having a set of normally closed contacts in the holding circuit of said answering relay, said set of normally closed contacts operable to deenergize said answering relay after a predetermined short interval, an enabling relay operable responsive to the receipt of a transmission signal at said receiver for actuating said phasing means and having a set of normally open contacts connected in parallel across said answering relay set of contacts whereby said incoming call is maintained if the transmission signal is received within said predetermined time interval, and means including a set of switch contacts operative responsive to a short paper supply for disabling said answering and enabling relays.

19. The facsimile receiver of claim 18 comprising in addition means operative responsive to the opening of said service door for disabling said answering and enabling relays.

20. In a facsimile system for use with a telephone data transmission system: a facsimile transmitter for providing facsimile data signals for transmission through said telephone system comprising, a copy scanner, means including an alternating current power source for driving said scanner and means supplying a synchronizing signal from said power source to said telephone system to be transmitted therethrough; a facsimile receiver comprising means for receiving the facsimile data signals from said telephone system, separate means for receiving said synchronizing signal from said telephone system, a supply of recording paper, recording means for marking said paper responsive to said facsimile data signals, means including a motor for driving said recorder and for driving the paper through the receiver, a regulated supply of alternating current operable responsive to said separate receiving means for energizing said motor, enabling means operable responsive to the receipt of said synchronizing signal for actuating said driving means, means for supplying nonregulated alternating electric current, and means for switching said driving means to said nonregulated current means responsive to the deenergization of said enabling relay for a predetermined time interval required to drive the paper having a recorded copy out of said receiver.

21. In a facsimile system for use with a telephone data transmission system; a facsimile transmitter for providing facsimile data signals for transmission through said telephone system comprising, a copy scanner, means including an alternating current power source for driving said scanner and means supplying a synchronizing signal from said power source to said telephone system to be transmitted therethrough; a facsimile receiver comprising means for receiving the facsimile data signals from said telephone system, separate means for receiving said synchronizing signal from said telephone system, a supply of recording paper, recording means for marking said paper responsive to said facsimile data signals, means including a motor for driving said recorder and for driving the paper through the receiver, a regulated supply of alternating current operable responsive to said separate receiving means for energizing said motor, an enabling relay having a set of normally open contacts operable responsive to the receipt of said synchronizing signal for connecting said driving means to said regulated current supply, means for supplying nonregulated alternating electric current, circuit means including a set of normally closed contacts operable by said enabling relay for connecting said motor to said nonregulated current means, a copy runout relay having a holding circuit and a set of normally open contacts in said motor connecting circuit means, means for actuating said copy runout relay responsive to the energization of said enabling relay, a time delay relay initiated responsive to the deenergization of said enabling relay and having a set of normally closed contacts in the holding circuit of said copy runout relay.

22. In a facsimile system for use with a telephone data transmission system which relays data signals and a synchronizing signal from a facsimile transmitter at a calling station, a facsimile receiver comprising means for receiving the facsimile data signals from said telephone system, separate means for receiving said synchronizing signal from said telephone system, a supply of recording paper, recording means for marking said paper responsive to said facsimile data signals, means including a motor for driving said recorder and for driving said paper through the receiver, a regulated supply of alternating current operable responsive to said separate receiving means for energizing said motor, enabling means operable responsive to the receipt of said synchronizing signal for connecting said driving means to said regulated current supply, means for supplying nonregulated alternating electric current, circuit means for connecting said motor to said nonregulated current supply means, copy runout means operable responsive to said enabling means for preparing said connecting circuit means, means operable responsive to the deenergization of said enabling means for completing said connecting circuit means, and time delay means initiated responsive to the deenergization of said enabling means for opening said connecting circuit means a predetermined time interval after the cessation of the receipt of said signals.

23. In a facsimile system for use with a telephone data transmission system which relays data signals and a synchronizing signal from a facsimile transmitter at a calling station; a facsimile receiver comprising means for receiving the facsimile data signals from said telephone system, separate means for receiving said synchronizing signal from said telephone system, a supply of recording paper, recording means for marking said paper responsive to said facsimile data signals, means including a motor for driving said recorder and for driving the paper through the receiver, a regulated supply of alternating current operable responsive to said separate receiving means for energizing said motor, enabling means operable responsive to the receipt of said synchronizing signal for actuating said driving means, means for supplying nonregulated alternating electric current, and means for switching said driving means to said nonregulated current means responsive to the deenergization of said enabling relay for a predetermined time interval required to drive the paper having recorded copy out of said receiver.

24. In a facsimile system for use with a telephone data transmission system which relays data signals and a synchronizing signal from a facsimile transmitter at a calling station; a facsimile receiver comprising means for receiving the facsimile data signals from said telephone system, separate means for receiving said synchronizing signal from said telephone system, a supply of recording paper, an electromechanical recorder for marking said paper responsive to said facsimile data signals, means including a motor for driving said recorder and for driving the paper through the receiver, a regulated supply of alternating current operable responsive to said separate receiving means for energizing said motor, an enabling relay having a set of normally open contacts operable responsive to the receipt of said synchronizing signal for connecting said driving means to said regulated current supply, means for supplying nonregulated alternating electric current, circuit means including a set of normally closed contacts operable by said enabling relay for connecting said motor to said nonregulated current means, a copy runout relay having a holding circuit and a set of normally open contacts in said motor connecting circuit means for actuating said copy runout relay responsive to the energization of said enabling relay, a time delay relay initiated responsive to the deenergization of said enabling relay and having a set of normally closed contacts in the holding circuit of said copy runout relay.

25. In a facsimile receiver having a rotatable helix and a grounded stationary printer bar for marking a recording medium in accordance with a fluctuating direct current facsimile signal, a marking signal circuit comprising an oscillator producing an output signal having a resonant frequency substantially higher than the average frequency of the facsimile signal, a common base transistor amplifier having its base in receipt of a fluctuating direct current facsimile signal and its emitter in connection with the oscillator output, means for biasing said transistor amplifier to cutoff when no marking signal appears, amplifying means including a transformer connected to the collector output of said transistor amplifier, rectifying and detecting means in receipt of the output of said transformer, a negative voltgae source, a vacuum tube amplifier having its grid in connection with said negative voltage source and said detector and rectifying means, a resistance connecting said plate to ground, means connecting the helix to said vacuum tube amplifier plate and means biasing said vacuum tube to cutoff when no signal appears at its grid.

26. In a facsimile receiver having a rotatable helix and a grounded stationary printer bar for marking a recording medium in accordance with a fluctuating direct current facsimile signal, a marking signal circuit comprising an oscillator, means for amplitude modulating the oscillator output signal with the facsimile signal, means including a transformer for amplifying, rectifying and detecting the amplitude modulated signal, an amplifier receiving the detected signal at its input and having its output connected to said helix, impedance means connecting said amplifier output to ground and means for biasing said amplifier to cutoff when in receipt of a minimum amplitude signal.

27. In a facsimile receiver having a rotatable helix and a grounded stationary printer bar for marking a recording medium in accordance with a fluctuating facsimile signal, a marking signal circuit comprising an oscillator producing an output signal having a resonant frequency substantially higher than the average frequency of the facsimile signal, means for amplitude modulating the oscillator output signal approximately one hundred percent with the marking signal, means including a transformer for amplifying, rectifying and detecting the amplitude modulated signal, an amplifier receiving the detected signal at its input and having its output connected to said helix, impedance means connecting the output of said amplifier to ground and means for biasing said amplifier to cutoff when no signal appears at its input.

28. In a facsimile receiver having a rotatable helix and a grounded stationary printer bar for marking a recording medium in accordance with a fluctuating facsimile signal, a marking signal circuit comprising an oscillator producing an output signal having a resonant frequency substantially higher than the average frequency of an incoming marking signal to said receiver, means for amplitude modulating the oscillator output signal with the facsimile signal, means for amplifying the modulated signal, means for demodulating the output of said modulating means, means including an amplifier for applying the demodulated signal to said second electrode, impedance means for connecting the output of said amplifier to ground, means for biasing said amplifier to cutoff when in receipt of a minimum amplitude signal and means providing direct current isolation between said modulated signal amplifying means and said demodulating means.

29. In a facsimile receiver having a grounded electrode and a second electrode for marking a recording medium passing therebetween in accordance with a fluctuating facsimile signal, a marking signal circuit comprising means for producing a subcarrier signal having a frequency substantially higher than the average frequency of the facsimile signal, means for modulating the subcarrier signal with the facsimile signal, means for amplifying the modulated signal, means for demodulating the output of said modulating means, means including an amplifier for applying the demodulated signal to said second electrode, impedance means connecting the output of said amplifier to ground, means for biasing said amplifier to cutoff when in receipt of a minimum demodulated signal, and means providing direct current isolation between said modulated signal amplifying means and said demodulating means.

References Cited

UNITED STATES PATENTS

| | | | |
|---|---|---|---|
| 3,084,213 | 4/1963 | Lemelson | 178—6.7 |
| 1,793,761 | 2/1931 | Tilden et al. | 179—5.5 |

ROBERT L. GRIFFIN, *Primary Examiner.*

J. A. ORSINO, Jr., *Assistant Examiner.*

UNITED STATES PATENT OFFICE
CERTIFICATE OF CORRECTION

Patent No. 3,428,749 February 18, 1969

Dudley Gray

It is certified that error appears in the above identified patent and that said Letters Patent are hereby corrected as shown below:

Column 14, line 66, "approximately" should read -- approximating --. Column 17, line 19, "actutable" should read -- actuatable --. Column 20, line 31, after "means" insert -- , means --; line 49, "voltgae" should read -- voltage --.

Signed and sealed this 7th day of April 1970.

(SEAL)
Attest:

Edward M. Fletcher, Jr.
Attesting Officer

WILLIAM E. SCHUYLER, JR.
Commissioner of Patents